Sept. 16, 1958   F. H. CHAMBERS ET AL   2,852,058
TUBELESS TIRE PATCH
Filed Sept. 26, 1956   3 Sheets-Sheet 1
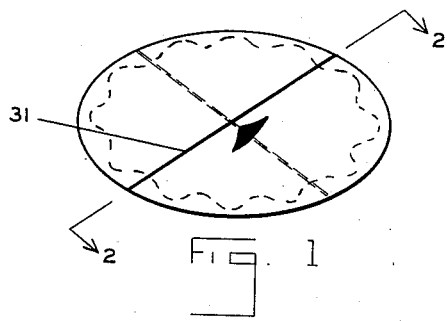
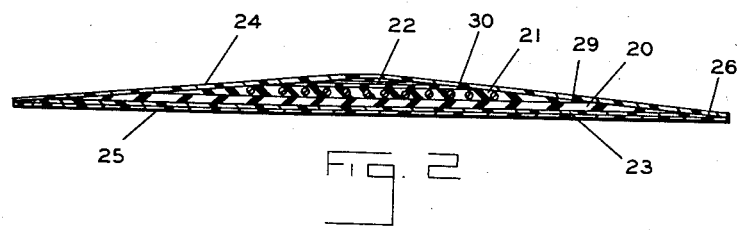
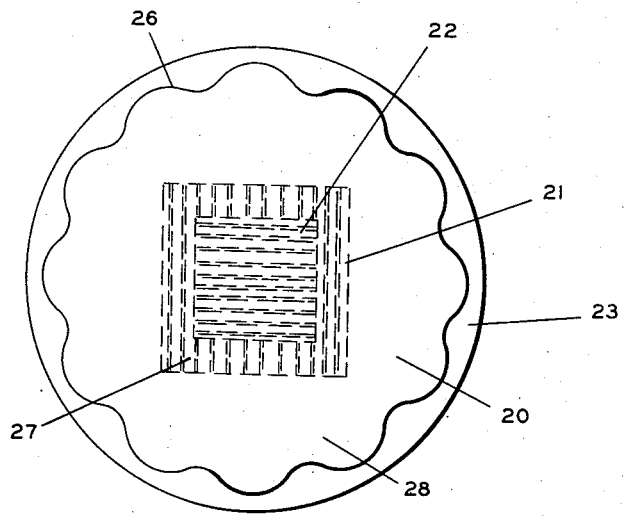
INVENTORS
FRANK H. CHAMBERS
GAIL B. MOATS
BY
CORBETT, MAHONEY & MILLER
ATTYS.

Sept. 16, 1958    F. H. CHAMBERS ET AL    2,852,058
TUBELESS TIRE PATCH
Filed Sept. 26, 1956    3 Sheets-Sheet 2
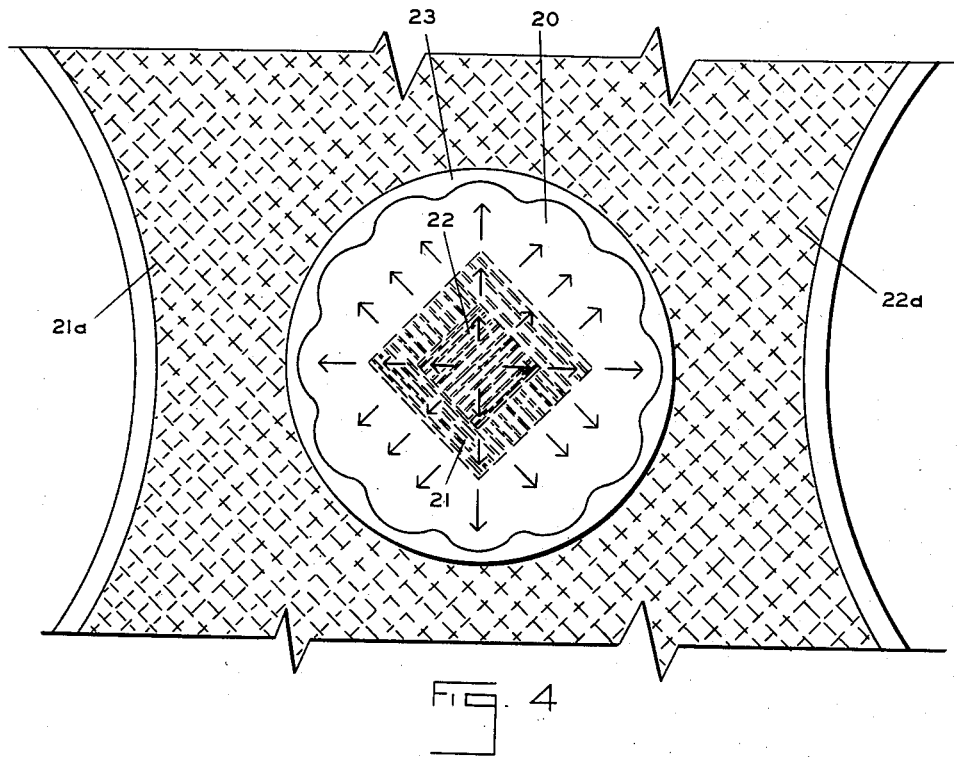
Fig. 4
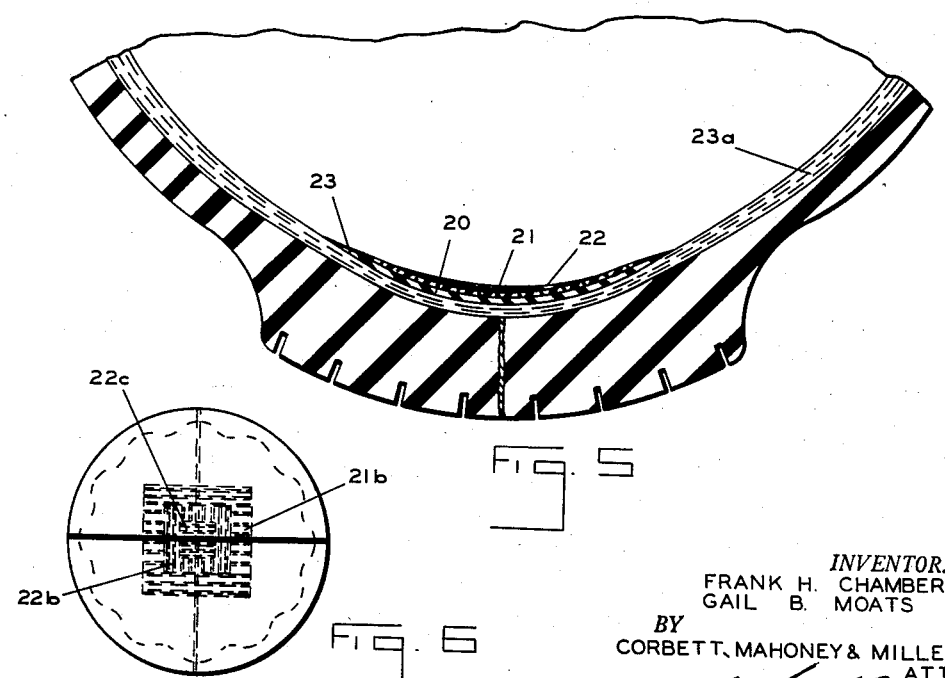
Fig. 5
Fig. 6
INVENTORS
FRANK H. CHAMBERS
GAIL B. MOATS
BY
CORBETT, MAHONEY & MILLER
ATTYS.
BY Sept. 16, 1958     F. H. CHAMBERS ET AL     2,852,058
TUBELESS TIRE PATCH
Filed Sept. 26, 1956                                                        3 Sheets-Sheet 3
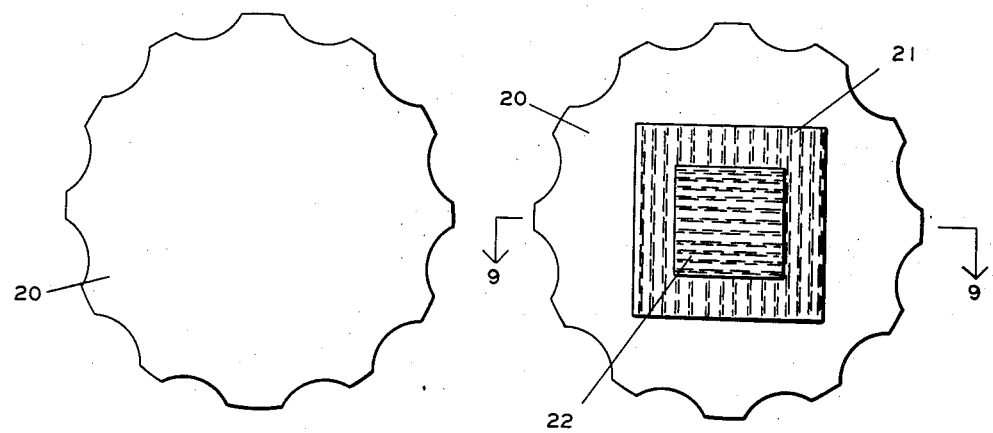
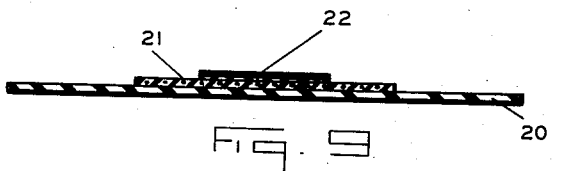
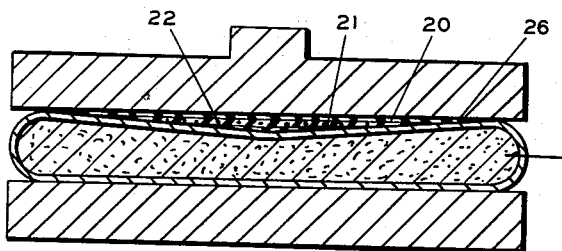
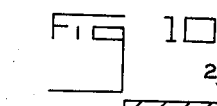
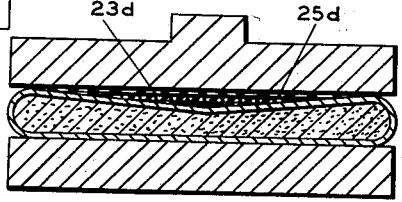
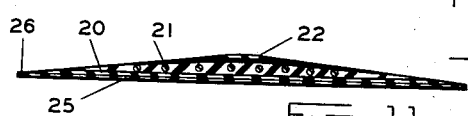
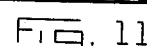
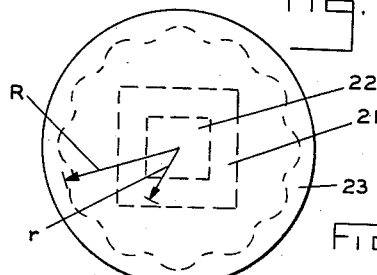
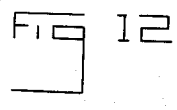
*INVENTORS*
FRANK H. CHAMBERS
GAIL B. MOATS
BY
CORBETT, MAHONEY & MILLER
ATTYS.
BY *Wm. V. Miller*

United States Patent Office 2,852,058
Patented Sept. 16, 1958

2,852,058

TUBELESS TIRE PATCH

Frank H. Chambers and Gail B. Moats, Johnstown, Ohio

Application September 26, 1956, Serial No. 612,165

2 Claims. (Cl. 152—367)

Our invention relates to a tubeless tire patch. It has to do, more specifically, with a tire patch which is designed especially to meet the conditions encountered in repairing a break or injury in a tubeless tire.

As is well known, tubeless tires are built up of a series of cord plies embedded in rubber and with the innermost ply covered with a sealing layer of non-abrasion rubber to make the tire airtight. Because of the presence of this inner sealing layer, which takes the place of the tube formerly used in tires, repairs for the tubeless tire cannot be treated like repairs for tube-containing tires and because of the combination of the cord plies and the sealing layer, repairs cannot be treated like repairs for tubes which consist merely of non-abrasion rubber with no cord reinforcement. We have found that for most effective repairs to a tubeless tire, the tire patches used heretofore are not entirely satisfactory and it is necessary to design a patch which takes into account the difference in flexibility between the cord plies and the sealing liner of the tubeless tire.

It is the main object of our invention to provide a patch which is designed especially to meet the conditions for repairs of a tubeless tire and in which a section of the patch is analogous in material and flexibility to the sealing liner of the tire and cooperates therewith and a section of the patch is analogous in material and flexibility to the cord plies of the tire and covers the injury to give the patch proper strength to prevent air pressure from pushing the patch outwardly into the injury, the entire patch being designed to have maximum flexibility in all directions so that it will flex with the inner sealing liner of the tire during use and will not work loose.

In the accompanying drawings we have illustrated a tubeless tire patch made in accordance with our invention.

In these drawings:

Figure 1 is an isometric view of a patch made according to our invention.

Figure 2 is an enlarged transverse sectional view through the complete patch taken along line 2—2 of Figure 1.

Figure 3 is a plan view of the patch.

Figure 4 is a view inside a tire casing showing the patch in position over an injury.

Figure 5 is a transverse sectional view taken along line 5—5 of Figure 4 through the tire casing and the patch applied thereto.

Figure 6 is a view similar to Figure 3 but showing a modification of the patch.

Figure 7 shows the non-abrasion rubber body of the patch.

Figure 8 shows the rubberized cord pads applied to the body of Figure 7.

Figure 9 is a transverse section taken along line 9—9 of Figure 8.

Figure 10 is a vertical sectional view showing the combination of Figure 9 being pressed and cured in a flexible press.

Figure 11 is a sectional view through the unit pressed and cured as in Figure 10.

Figure 12 shows a layer of raw gum or cushion gum to which is applied the unit of Figure 11.

Figure 13 is a view similar to Figure 10 illustrating a modification in the pressing and curing procedure.

With reference to the drawings, we have illustrated our complete patch in Figures 1 to 3. It consists mainly of a body 20 of non-abrasion rubber stock, a pair of rubberized cord plies 21 and 22 disposed on the upper surface of the body, and a layer 23 of cushion gum disposed on the lower side of the body. A protective covering film 24 is provided over the top of the patch and a protective film 25 is provided in covering relationship to the bottom of the patch but these films are removed when the patch is to be used.

As indicated above, the body 20 is made of relatively flexible non-abrasion rubber which is sometimes referred to as tread stock and is analogous in material and flexibility to the rubber sealing liner of a tubeless tire. The body 20 is relatively thick and of disk-like form but has a scalloped edge 26 as shown in Figures 1 and 3. This edge gradually tapers into a feather edge as illustrated in the sectional view in Figure 2. This gradual tapering of the edge into a feather edge is important to obtain maximum flexibility at the edge, which is important in providing a patch which will effectively adhere to the flexible sealing liner of the tubeless tire.

The pads of rubberized cord plies 21 and 22 are of material similar to the cord plies of the tire. Each pad has the cords therein extending in one direction only. The two pads are square and the lowermost one 21 is of somewhat greater area than the uppermost one 22. The pad 21 is placed over the body 20 and is exactly centered thereon. The pad 22 is placed on the pad 21 and is centered thereon leaving a marginal or border area 27 on the pad 21 not covered by the pad 22. The pad 22 is positioned at right angles relative to the pad 21 so that the cords in the two pads are disposed at right angles to each other. It is important that the pad 22 be somewhat smaller than the pad 21 so that the uncovered border area 27 of the pad 21 be substantial. It is also important that the pad 21 be of somewhat less area than the body 20 so that there will be a substantial circular marginal area 28 of the body not covered by the pad 21. A suitable formula for the relative sizes of these members is for one-half the width of the pad 21 to be equal to one-half the radius of the body 20 as indicated by a comparison of the distances $r$ and $R$ in Figure 12. The same type of rubber is used in the pads 21 and 22 that is used in the body 20 and these members are cured and vulcanized together as will later appear. The edges of the pads 21 and 22 will also be feather edges as indicated at 29 and 30 in Figure 2.

The patch unit will be placed in the tire over the injury as indicated in Figures 4 and 5 with its pads 21 and 22 at a 45° angle relative to the beads so that the cords of the pads will extend in approximately the same directions as the crossed cords 21a and 22a of the tire. The cushion gum layer 23 will be placed in contact with the inner sealing liner 23a of the tire and will adhere thereto.

The patch is designed in the manner described so that it will have maximum flexibility in all directions from the center to its outer edge yet will still have sufficient body and strength at its central area to prevent pressing out into the injury. The entire body 20 will be flexible from its center outwardly in all directions. The pad 21 will flex with the body in all directions except in the direction in which the cords thereof run. Similarly, the pad 22 will flex with the pad 21 and with the body 20 in all directions except in the direction of the cords thereof. The result is that the uncovered marginal area 28 of the body will have maximum flexibility in all directions. The area covered by the pad 21 and not by the pad 22 will have maximum flexibility in all directions but one, and the area covered by both pads 21 and 22 will have maximum flexibility in any direction except in the directions in which the cords of pads 21 and 22 run and which are exactly at right angles to each other. This flexibility is indicated by the arrows in Figure 4 which illustrate the flexibility of each area and show that maximum flexibility of the complete patch is diagonally of the pads. Therefore, the maximum flexibility of the patch from the center outwardly to its edge, when positioned in the tire in the manner indicated, will be in two directions, namely, in a bead-to-bead direction and in a direction circumferentially of the tire. Thus, maximum flexibility of the patch in the directions needed when the patch is in operation in the tire will be obtained. Furthermore, this is obtained even though the cord-reinforced pads 21 and 22 are used. These reinforced pads will be over the injury and will prevent the air pressure in the tire from pushing the patch out into the injury.

In some cases, it may be desirable to use more reinforcing pads or plies as indicated in Figure 6 where an additional cord ply pad is shown at 22c. This pad 22c will be of less area than the uppermost pad 22b. The cords in the pad 22c will extend in the same direction as those in the pad 21b and at right angles to those in the pad 22b. This patch will function in a manner analogous to the patch previously described except that there will be greater pressure-resisting reinforcement over the injury.

In order to obtain maximum flexibility in the patch, it should be formed as indicated in Figures 7 to 13. First, the body 20 of proper material is selected preferably from non-abrasion rubber stock of suitable Mooney test. The body selected is preferably relatively thick and of disk form and its edge is then scalloped. As shown in Figures 2 and 9, the pads 21 and 22 are then superimposed on the body 20 and centered thereon. The entire laminated unit may then be positioned in a press having a flexible bottom B as shown in Figure 10. Under a suitable pressure and a temperature of about 280° to 360° F. the unit is pressed and cured or vulcanized. The cured body will have a durometer hardness of between 40 and 55. The result is that the rubber in the body 20 will flow and form the feather edge 26 and the rubber of the pads 21 and 22 will flow and join the pads to each other and to the body 20. After the unit is removed from the press, it is placed on a relatively thin disk or layer 23 of cushion gum (Figure 10) which is carried by a protective film 25 and which will serve as means for causing the patch to adhere to the tire. This cushion gum layer 23, as shown in Figure 2, will extend outwardly beyond the edge of the body 20. The upper protective film 24 is then applied to the upper surface of the patch. The protective films 24 and 25 may be of Holland cloth, foil, "Mylar," polyethylene, or other suitable material. Each is preferably slit across its diameter as indicated at 31 in Figure 1 to facilitate stripping from the patch.

Instead of pressing and curing the unit of Figure 8 as in Figure 10, the operation indicated in Figure 13 may be used. In this case the unit of Figure 8 will first be positioned on a layer of cushion gum 23d which will carry the film 25d which, in this instance, is preferably of foil to be heat resistant. This entire unit can then be subjected to a pressing and curing operation. The cushion gum 23d will be such that it will not cure during this operation due to the fact that it will not have curing agents present in it. These curing agents may be added to the gum by means of a cement applied thereto which will contain them. If desired, the unit of Figure 8 can be partially cured before putting it in the press with the layer of cushion gum and then the curing can be completed. The patch will, if made by this method, be complete upon removal of the press with the exception of the upper protective film which can then be applied.

It will be apparent from the above description that we have provided a patch which is designed especially for tubeless tires. The patch will have the maximum flexibility in the directions needed most so that it will not tend to work loose from the cushion gum liner of the tire yet will be reinforced with cord plies at its center over the injury so that the patch will not tend to push out into the injury.

Various other advantages will be apparent.

Having thus described our invention, what we claim is:

1. A patch for tubeless tires comprising a body of substantially circular outline and being of non-abrasion rubber, at least two cord ply pads of substantially square form disposed on said body in centered relationship thereto, said body and ply pads being vulcanized together to constitute a unitary structure the cords in each of said pads extending in one direction only and the cords in the two pads being at right angles to each other, said pads being of different areas to provide a smaller pad and a larger pad so that the edge of the smaller pad is spaced within the edge of the larger pad to provide an uncovered continuous outer marginal area of the larger pad, said larger pad being of such size relative to the circular body that one-half the width thereof is not greater than one-half the radius of the body so that the larger pad is well within the area of said body to provide a substantial continuous flexible marginal area between the outer edge of said larger pad and the outer edge of said body, both of said pads having feather edges so that the smaller pad merges with the larger pad and the larger pad merges with the body, said body also having a feather edge, and said unitary structure being secured to a layer of cushion gum.

2. A tubeless tire repaired with the patch of claim 1 in which the casing of the tire is formed of cord plies with an inner sealing layer of non-abrasion rubber, the cords of the plies extending in criss-crossed relationship to the beads of the tire, said layer of cushion gum being between the circular body of the patch and the inner sealing layer of the casing to cause the patch to adhere thereto, and said patch being located within the casing with the pads centered over the injury and at such an angle relative to the beads that the crossed cords of the pads extend in the same directions as the crossed cords of the casing.

References Cited in the file of this patent

UNITED STATES PATENTS

| | | |
|---|---|---|
| 1,968,606 | Knapton | July 31, 1934 |
| 2,486,669 | Nassimbene | Nov. 1, 1949 |
| 2,587,759 | Pierce et al. | Mar. 4, 1952 |

OTHER REFERENCES

Tires TBA Merchandising, volume XXXV, Number 11, June 1954, page 36, "Nylon Repair Units."